(12) United States Patent
Tsai et al.

(10) Patent No.: US 10,705,264 B2
(45) Date of Patent: Jul. 7, 2020

(54) VARIFOCAL LENS MODULE

(71) Applicant: CONCRAFT HOLDING CO., LTD., Grand Cayman (KY)

(72) Inventors: Tzu-Ching Tsai, New Taipei (TW); Jie-Ru Chen, New Taipei (TW)

(73) Assignee: CONCRAFT HOLDING CO., LTD., Grand Cayman (KY)

(*) Notice: Subject to any disclaimer, the term of this patent is extended or adjusted under 35 U.S.C. 154(b) by 146 days.

(21) Appl. No.: 16/053,121

(22) Filed: Aug. 2, 2018

(65) Prior Publication Data

US 2019/0302324 A1  Oct. 3, 2019

(30) Foreign Application Priority Data

Apr. 3, 2018  (TW) .............................. 107111717 A

(51) Int. Cl.
| | | |
|---|---|---|
| *G02B 3/14* | (2006.01) | |
| *G02B 26/00* | (2006.01) | |
| *G02B 13/00* | (2006.01) | |

(52) U.S. Cl.
CPC ........... *G02B 3/14* (2013.01); *G02B 13/0075* (2013.01); *G02B 26/004* (2013.01)

(58) Field of Classification Search
CPC ..... G02B 3/14; G02B 13/0075; G02B 26/004

USPC .......................................................... 359/665
See application file for complete search history.

(56) References Cited

FOREIGN PATENT DOCUMENTS

| TW | I363202 B | 5/2012 |
|---|---|---|
| TW | I402599 B | 7/2013 |

*Primary Examiner* — Mohammed A Hasan
(74) *Attorney, Agent, or Firm* — Muncy, Geissler, Olds & Lowe, P.C.

(57) ABSTRACT

A varifocal lens module, consisting of a casing provided with a holding chamber, an opening end, an interconnecting hole, a soft lens disposed on the casing to seal the holding chamber, and a medium control device connects to the interconnecting hole. The soft lens is provided with a first curved surface having a first curvature exposed external of the casing and a second curved surface having a second curvature positioned interior of the holding chamber corresponding to the first curved surface. The medium control device is connected to the interconnecting hole for controlling the volume of the medium inside the holding chamber, whereby the change in volume of the medium changes the compression on the second curved surface, thereby modifying the second curvature of the second curved surface, producing a variation in the spacing between the second curved surface and the first curved surface to achieve a varifocal effect.

10 Claims, 3 Drawing Sheets

VARIFOCAL LENS MODULE

BACKGROUND OF THE INVENTION (a) Field of the Invention

The present invention relates to a lens module, and more particularly to a varifocal lens module.

(b) Description of the Prior Art

A varifocal lens module has substantial application in smart cell phones and cameras, which use variation in focal length to realize a more well defined image formation effect.

Existing varifocal lens modules, such as Taiwan Patent No. 1363202, which discloses a lens module with adjustable lens curvature, which primarily comprises a group of lens mounted in a frame, wherein the group of lens comprises a base lens, and at least one soft lens mounted on at least one side of the base lens. A gap is provided between the base lens and the soft lens, and an inlet is provided on one side of the frame that connects to the gap. A liquid supply device containing a liquid is connected to the inlet, and a control device is used to inject the liquid inside the liquid supply device into the gap between the lens through the inlet of the frame, thereby modifying the curvature of each of the lens.

However, Taiwan Patent No. 1363202 primarily achieves the effect of modifying curvature through the liquid causing deformation of the entire soft lenses, and causes concurrent deformation of the two corresponding surfaces of the soft lenses during deformation. Hence, absolute control of curvature change between the two corresponding surfaces cannot be achieved during the deformation process of the soft lens, and thus unable to realize absolute control of focal variation, which results in stray light phenomena occurring.

Furthermore, Taiwan Patent No. 1402599, which discloses a lens module and camera module, comprising: a lens cone, wherein a side wall of the lens cone is provided with at least one ventilating hole; a first lens contained within the lens cone, wherein the first lens is mounted and fixed within the lens cone; a second lens contained within the lens cone, wherein the second lens is provided with a main body and a circumferential elastic portion encircling the main body, which fits tightly to the lens cone. The second lens, the first lens, and the lens cone define a space, and the space connects to the at least one ventilating hole. An air pressure control device connects to the at least one ventilating hole and is used to change the air pressure in the space, thereby driving the second lens to move relative to the first lens.

However, Taiwan Patent No. 1402599 primarily achieves a zooming effect by changing the distance between the first lens and the second lens. And although such a method can effectively control curvature variation, the size of the entire lens module is relatively large, and thus cannot be applied in the thinning trend of smart cell phones or cameras, Accordingly, the objectives of the present invention is to resolve the technical problems to provide a lens module having application within smart cell phones or cameras, has a small size, and is able to effectively control zoom focal length.

SUMMARY OF THE INVENTION

The main object of the present invention lies in providing a varifocal lens module having a small size and able to effectively control zoom focal length.

In order to attain the aforementioned object, the varifocal lens module of the present invention comprises a casing, a soft lens, and a medium control device, wherein the casing is provided with a holding chamber, an opening end that is connected to the holding chamber, and an interconnecting hole. The soft lens is disposed on the opening end of the casing to seal the holding chamber, and the soft lens is provided with a first curved surface exposed external of the casing and has a first curvature, moreover, the soft lens is provided with a second curved surface having a second curvature positioned within the holding chamber corresponding to the first curved surface. The medium control device connects to the interconnecting hole and is used to control the volume of the medium inside the holding chamber, whereby a change in volume of the medium inside the holding chamber changes the compression on the second curved surface, thereby modifying the second curvature of the second curved surface, producing a variation in the spacing between the second curved surface and the first curved surface.

In the embodiment, the casing further comprises an outer casing and a sealing plate. The opening end is provided on the top end of the outer casing, and the interconnecting hole is provided in one side of the outer casing. Moreover, the holding chamber is assembled from the outer casing and the sealing plate.

In the embodiment, the outer casing is produced using a lightproof hard plastic.

In the embodiment, the soft lens is formed directly at the opening end of the outer casing using an injection molding method.

In the embodiment, the sealing plate is produced using a transparent hard plastic.

In the embodiment, the soft lens is produced using a transparent soft material.

In the embodiment, the soft material is silicone.

In the embodiment, the first curved surface is a convex lens.

In the embodiment, the second curved surface is a concave lens.

In the embodiment, the medium is selected from either a liquid or a gas.

The varifocal lens module of the present invention is provided with the following advantages compared to the prior art:

1. The present invention can achieve a varifocal effect through a change in volume of the medium inside the holding chamber, which enables compressing the second curved surface of the soft lens that further modifies the second curvature of the second curved surface, thereby enabling curvature change of a single surface to effectively impose control of the zoom focal length.

2. The present invention uses change in curvature of a single surface to effectively enable reducing the size of the lens module, thus having further application in smart cell phones or cameras.

To enable a further understanding of said objectives and the technological methods of the invention herein, a brief description of the drawings is provided below followed by a detailed description of the preferred embodiments.

DETAILED DESCRIPTION OF THE PREFERRED EMBODIMENTS

Figure 1:
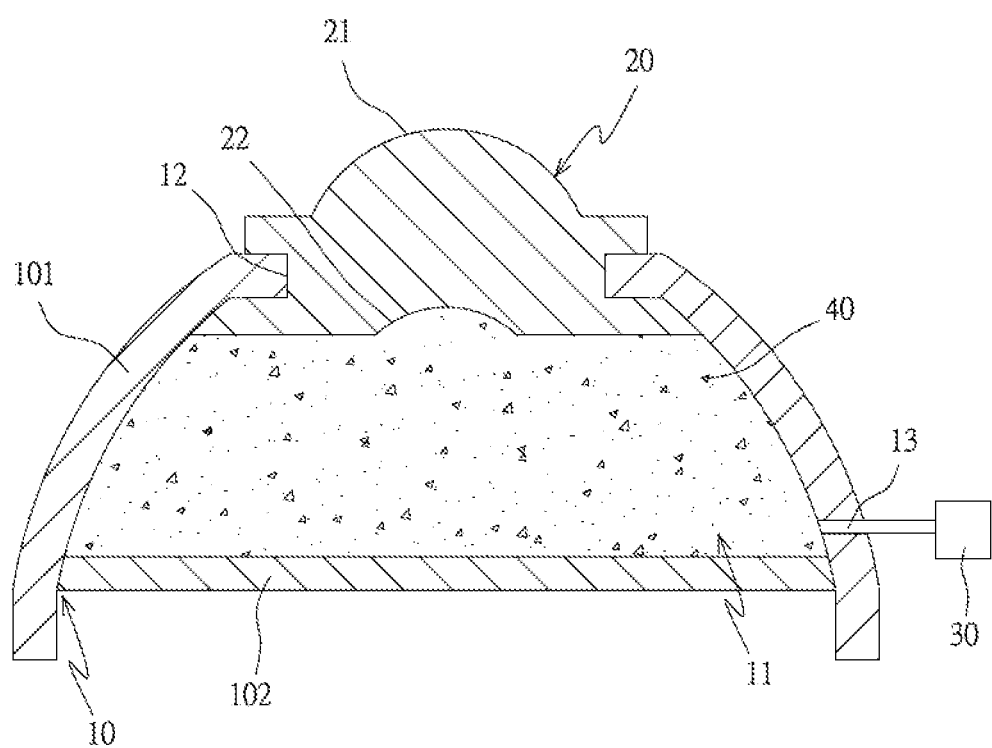
FIG. 1 is a cross-sectional view of a lens module provided by an embodiment of the present invention.

Regarding the detailed content and structural means of the present invention, please refer to the description of the diagrams as follows:

Referring to FIG. 1, which shows a varifocal lens module of the present invention, comprising a casing 10, a soft lens 20, and a medium control device 30.

Specifically, the casing is provided with a holding chamber 11, an opening end 12 that connects to the holding chamber 11, and an interconnecting hole 13 provided on one side of the casing 10 and interconnected to the holding chamber 11. In the present embodiment, the casing 10 is assembled from an outer casing 101 and a sealing plate 102, wherein the outer casing 101 is produced from a lightproof hard plastic using an injection molding method. The opening end 12 is positioned on the top end of the outer casing 101, and the interconnecting hole 13 is provided in one side of the external casing 101. The sealing plate 102 is formed from a transparent hard plastic, and a high frequency method is used to securely fix the sealing plate 102 to the outer casing 101 corresponding to the location of the opening end 12, moreover, the sealing plate 102 is used to seal the outer casing 101 and form the holding chamber 11.

The soft lens 20 is disposed on the opening end 12 of the outer casing 101, thereby enabling the holding chamber 11 to form a sealed-in space. In the present embodiment, the soft lens 20 is formed as an integral body from a transparent soft material, such as silicone, using an injection molding method, and is positioned at the location of the opening end 12, enabling the soft lens 20 and the outer casing 101 to be combined into a single body. The soft lens 20 is provided with a first curved surface 21 exposed external of the casing 10 and a second curved surface 22 positioned within the holding chamber 11. The first curved surface 21 has a first curvature and the second curved surface 22 has a second curvature, wherein the first curved surface 21 forms a convex lens and the second curved surface 22 forms a concave lens.

The medium control device 30 and the interconnecting hole 13 provided in one side of the casing 10 are interconnected. The medium control device 30 is used to inject a medium 40 into the interior of the holding chamber 11 through the interconnecting hole 13. In the present embodiment, the medium 40 is selected from either a gas or a liquid, and injecting the medium 40 into the interior of the holding chamber 11 through the interconnecting hole 13 using the medium control device 30 enables varying the volume of the medium 40 inside the holding chamber 11.

Figure 2:
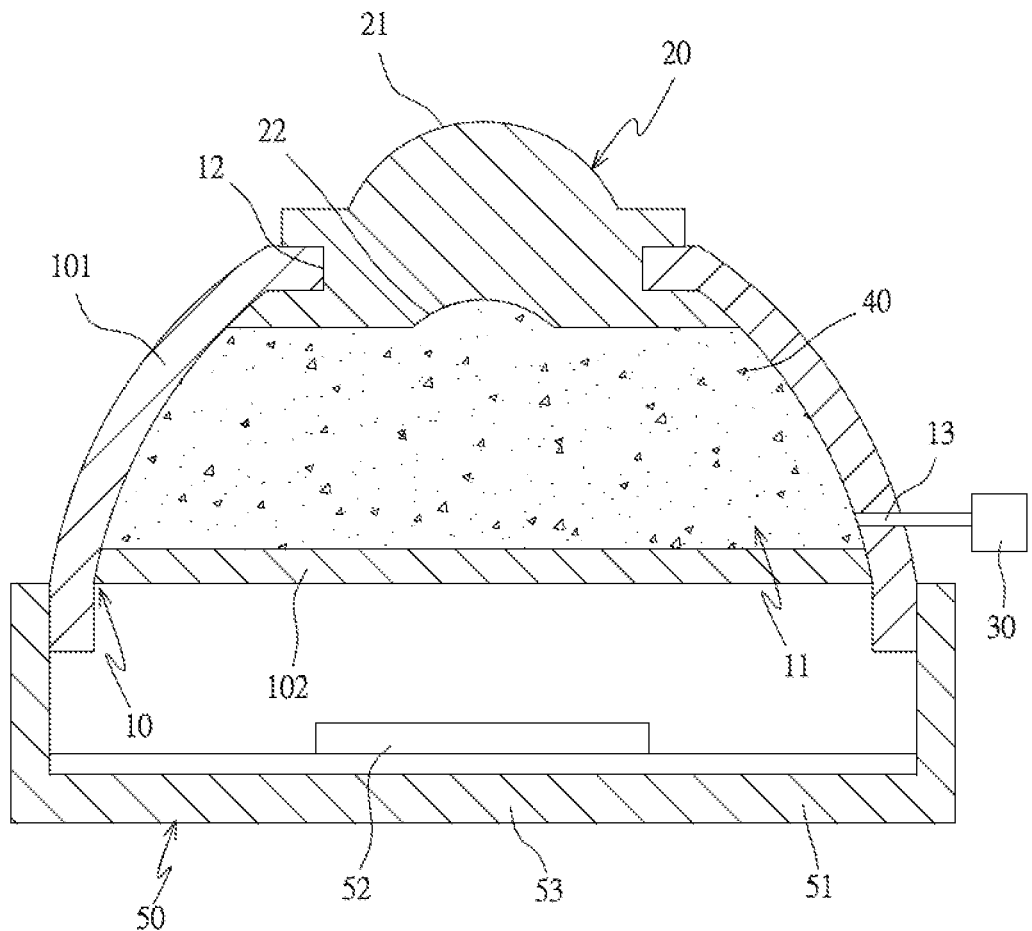
FIG. 2 is a cross-sectional view of the embodiment depicting application inside a camera module according to the present invention.

Referring to FIG. 2, when the varifocal lens module of the present invention is applied in a camera module 50, wherein the camera module 50 comprises a lens base 51, an image sensing module 52, and a circuit board 53. The casing 10 is used to connect to the lens base 51, enabling positioning the sealing plate 102 above the image sensing module 52, and the image sensing module 52 is electrically connected to the circuit board 53, which is mounted within the lens base 51.

Figure 3:
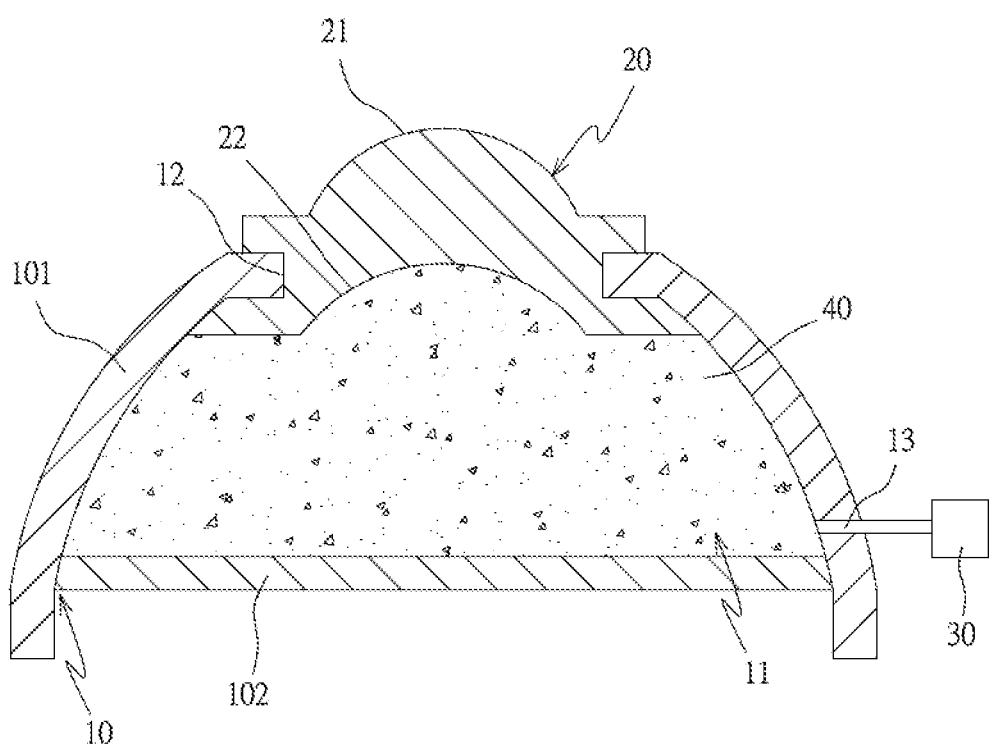
FIG. 3 is a cross-sectional view depicting change in a second curvature of a soft lens in the lens module shown in FIG. 1.

Referring to FIG. 1, the second curvature of the second curved surface 22 of the soft lens 20 is the initial shape thereof, at which time, the volume of the medium 40 is less than or equal to the volume of the holding chamber 11. Referring to FIG. 3, when the medium control device 30 is opened, the medium 40 is caused to enter the interior of the holding chamber 11 through the interconnecting hole 13. Following the volume gain of the medium 40 inside the holding chamber 11, because the outer casing 101 and the sealing plate 102 are both manufactured from hard plastic, and the soft lens 20 is manufactured from silicone, thus, when the volume of the medium 40 inside the holding chamber 11 gradually increases, the medium 40 also gradually compresses the second curved surface 22 of the soft lens 20, which causes the second curvature of the second curved surface 22 to change that results in a gradual increase in the second curvature, thereby causing the second curved surface 22 to gradually draw closer towards the first curved surface 21 and shortening the spacing between the first curved surface 21 and the second curved surface 22.

After the medium 40 flows back into the medium control device 30 through the interconnecting hole 13, then the volume of the medium 40 inside the holding chamber 11 gradually reduces, thus enabling the soft lens 20 to gradually return to its initial state through the elastic behavior of silicone. Accordingly, the medium 40 enables modifying the second curvature of the second curved surface 22, thereby achieving a varifocal effect.

It is worth mentioning that the present invention primarily enables modifying the second curvature of the second curved surface 22 through varying the volume of the medium 40 inside the holding chamber 11. Accordingly, compared to the prior art, the present invention has advantages including using modifying the curvature of the single curved surface of the soft lens 20 to realize the varifocal function, which not only enables effective control of focal variation but also concurrently further enables reducing overall size. Furthermore, the present invention enables application in thinner smart cell phones or cameras, thereby satisfying the requirement for the thinning tendency of mobile devices.

In conclusion, the present invention clearly complies with the essential elements as required for a new patent application, thus, a new patent application is proposed herein.

It is of course to be understood that the embodiments described herein are merely illustrative of the principles of the invention and that a wide variety of modifications thereto may be effected by persons skilled in the art without departing from the spirit and scope of the invention as set forth in the following claims.

What is claimed is:

1. A varifocal lens module, comprising:
   a casing, which is provided with a holding chamber, an opening end that connects to the holding chamber, and an interconnecting hole;
   a soft lens, which is disposed on the opening end of the casing to seal the holding chamber, the soft lens is provided with a first curved surface having a first curvature that is exposed external of the casing, moreover, the soft lens is provided with a second curved surface having a second curvature positioned within the holding chamber corresponding to the first curved surface; and
   a medium control device, which connects to the interconnecting hole and is used to control the volume of a medium inside the holding chamber, whereby a change in volume of the medium inside the holding chamber changes the compression on the second curved surface, thereby modifying the second curvature of the second curved surface, producing a variation in the spacing between the second curved surface and the first curved surface.

2. The varifocal lens module according to claim 1, wherein the casing further comprises an outer casing and a sealing plate, the opening end is provided on the top end of the outer casing, the interconnecting hole is provided in one side of the outer casing, and the holding chamber is assembled from the outer casing and the sealing plate.

3. The varifocal lens module according to claim 2, wherein the outer casing is produced using lightproof hard plastic.

4. The varifocal lens module according to claim 3, wherein the soft lens is formed directly at the opening end of the outer casing using an injection molding method.

5. The varifocal lens module according to claim 2, wherein the sealing plate is produced using a transparent hard plastic.

6. The varifocal lens module according to claim 1, wherein the soft lens is produced using a transparent soft material.

7. The varifocal lens module according to claim 6, wherein the soft material is silicone.

8. The varifocal lens module according to claim 1, wherein the first curved surface is a convex lens.

9. The varifocal lens module according to claim 1, wherein the second curved surface is a concave lens.

10. The varifocal lens module according to claim 1, wherein the medium is selected from either a liquid or a gas.

* * * * *